Patented July 10, 1951

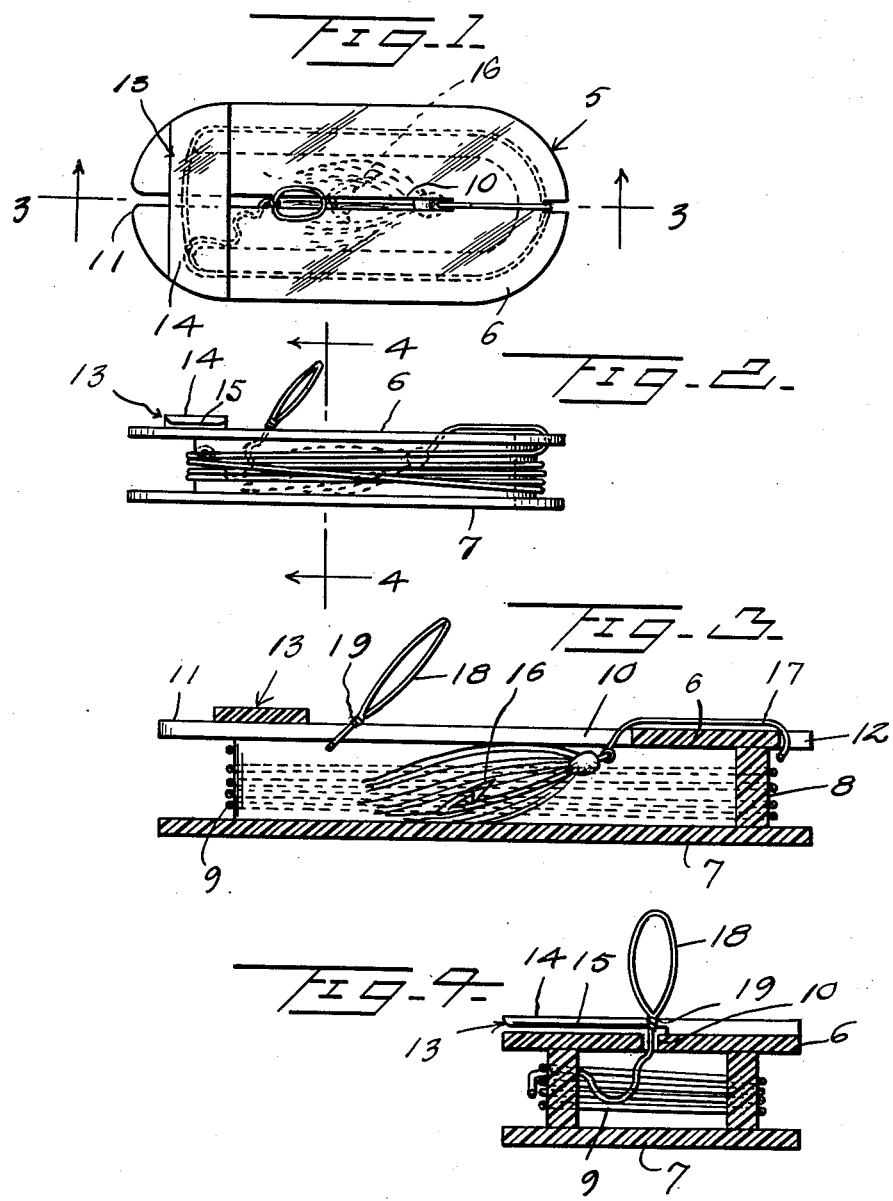

2,559,780

UNITED STATES PATENT OFFICE 2,559,780

ARTIFICIAL LURE AND LEADER PROTECTOR AND HOLDER

Peter Martinson, Tacoma, Wash.

Application November 25, 1949, Serial No. 129,323

5 Claims. (Cl. 242—129)

This invention relates to a novel holder and protector for artificial lures and leaders and which is primarily intended and adapted for use for holding and protecting dry and wet flies and their leaders so that the feathers of the fly will not be damaged and to prevent entanglement and ensnarling of a plurality of such flies and leaders.

Still another object of the invention is to provide a holder and protector which is adapted to be formed of a transparent material so that the encased fly or lure will be visible to enable the fisherman to select a desired lure.

Still another object of the invention is to provide a holder and protector which is light in weight and relatively small and which readily adapts itself to storage in a compact manner of a number of corresponding holders, each containing an artificial lure and its leader.

Still a further object of the invention is to provide a holder and protector which may be economically manufactured and sold and which will be durable and efficient for accomplishing its intended purpose.

Various other objects and advantages of the invention will hereinafter become more fully apparent from the following description of the drawing, illustrating a presently preferred embodiment thereof, and wherein:

Figure 1 is a top plan view showing the invention with a fly and leader applied thereto;

Figure 2 is a side elevational view thereof;

Figure 3 is an enlarged longitudinal sectional view taken substantially along a plane as indicated by the line 3—3 of Figure 1, and Figure 4 is an enlarged cross sectional view taken substantially along a plane as indicated by the line 4—4 of Figure 2.

Referring more specifically to the drawing, the artificial lure and leader holder and protector in its entirety and comprising the invention is designated generally 5 and includes a top wall or panel 6 and a bottom wall or panel 7. A spacing member 8 which is U-shaped in top plan is interposed between the walls 6 and 7 and has one edge thereof resting upon the bottom wall 7 and the other edge thereof engaging the adjacent side of the top wall 6. The spacing member 8 may be secured in any suitable manner to the walls 6 and 7, as by being molded integral therewith and suitably bonded thereto. The parts 6, 7 and 8 are preferably formed of plastic and are likewise preferably transparent. The walls 6 and 7 are of substantially the same shape and size and are each longer and wider than the spacing member 8 so that said spacing member is spaced from the ends and side edges of the walls 6 and 7. As seen in Figure 1, the ends of the walls 6 and 7 are preferably rounded so as to be substantially semi-circular. It will thus be seen that the spacing member 8 forms a rounded end wall adjacent one end of the holder 5 and also provides side walls which, like said end wall are inwardly spaced with respect to the adjacent edges of the top and bottom walls 6 and 7. The spacing member 8 being open at its opposite end, as seen at 9, provides an open end of the holder 5.

The top wall 6 is provided with an elongated slot 10 which is disposed centrally and extends longitudinally thereof from adjacent the intermediate portion of the spacing member 8 to the end of the top wall 6, which is located adjacent the open end 9 of said spacing member and, as seen in Figure 1, the slot 10 is preferably provided with a flared mouth 11 which opens outwardly of the end of the wall 6, located remote to the intermediate portion of the spacing member 8. The top wall 6 is likewise provided with a longitudinally disposed notch 12 which opens outwardly of its opposite end and is disposed in alignment with the slot 10 and which extends inwardly to a point adjacent the outer surface of the intermediate portion of the spacing member 8.

The holder 5 also includes a retaining member comprising a bar 13 which is likewise preferably formed of a plastic corresponding to the parts 6, 7 and 8 and which is disposed on the upper side of the top wall 6 and transversely thereof and which is located adjacent the end of the top wall 6 from which the slot 10 opens. The bar 13 has its ends shaped so as not to overlie the edge portions of the wall 6, as seen in Figure 1. The part of the bar located on one side of the slot 10 is suitably bonded to or otherwise connected to the top wall 6 while the opposite end 14 thereof is under-cut and beveled at its end and side edges and on its underside, as seen at 15 in Figures 2 and 4, so as to be spaced slightly from the upper surface of the top wall 6.

A conventional fishing fly has been illustrated in the drawing together with its leader to illustrate the application and use of the holder and protector 5 and said fly is designated 16 and the leader thereof is designated generally 17. The cross sectional size of the leader 17 has been exaggerated as said leader is ordinarily formed of relatively fine nylon or gut and is connected at one end thereof to the eye of the fly 16 and is provided with a loop 18 at its opposite end, formed therein by looping said end back and tying it to form a knot 19.

To apply the fly and leader to the holder and protector 5, a portion of the leader 17 adjacent the fly 16 is passed under the bar end 14 and moved laterally between said end 14 and the top wall 6 so that the leader 17 can be drawn longitudinally through the slot 10, entering said slot at its flared mouth 11 and being drawn toward its opposite, closed end. In this manner, the fly 16 will be drawn into the holder 5 between the walls 6 and 7 and through the open end 9 of the spacing member 8 for positioning the fly within the holder 5 and in the position as illustrated in Figures 1, 2 and 3. The leader 17 is then passed downwardly through the notch 12, as illustrated in Figures 1, 2 and 3 and is then wound around the spacing member 8 until less than a complete wrapping of the leader remains at the end of the protector 5 adjacent the bar 13. This leader portion which is located adjacent the loop 18 is then entered into the slot 10 through its mouth 11 and will pass under the bar portion 14 so as to engage the slot 10 between the bar 13 and the closed end of said slot 10. Depending upon the length of the leader 17, the knot 19 may be located either above or beneath the top wall 6.

It will thus be seen that an artificial lure and leader may be quickly and easily applied to the holder 5 and will be detachably retained therein in a position where the lure will be completely protected and the leader wound so that the lure cannot be injured and the leader not become ensnarled with other lures and leaders. By merely reversing the operation, previously described, the lure and leader may be quickly and easily removed from the holder 5. By making the holder 5 transparent, the lure or fly 16 will be visible while in a protected, applied position so that the fisherman may select a desired lure without the necessity of removing the lures from the protectors in order to select the lure desired.

Various modifications and changes are contemplated and may obviously be resorted to, without departing from the spirit or scope of the invention as hereinafter defined by the appended claims.

I claim as my invention:

1. An artificial lure and leader holder and protector comprising a top wall and a bottom wall of uniform size and shape, a spacing member interposed between and secured to the top wall and bottom wall, said spacing member defining an end wall and side walls and being spaced inwardly from the contiguous edges of the top and bottom walls, said holder being open at one end thereof and being closed at its opposite end by the portion of said spacing member forming the end wall, said top wall having a longitudinal slot disposed intermediate of its side edges and extending from adjacent the end wall portion of the spacing member to the end of the top wall located remote thereto and being open at its last mentioned end, said top wall being provided with a notch opening outwardly of its opposite end and disposed substantially in alignment with said slot.

2. A holder and protector as in claim 1, said spacing member being substantially U-shaped and having a rounded intermediate portion, and said top and bottom walls having substantially parallel side edges and rounded ends.

3. A protector and holder as in claim 1, said protector defining a chamber within the spacing member and between the top and bottom walls adapted to contain an artificial lure applied thereto or removed therefrom through the open end of the spacing member, said slot having a portion opening directly into the chamber adapted to receive a portion of the leader which projects from the lure outwardly of the holder, said leader being adapted to pass downwardly through said notch and be wound about the spacing member and with its free end engaging in said slot, and a retaining member secured to the outer surface of said top wall and extending transversely across a portion of the slot for retaining the last mentioned end of the leader in engagement with the slot.

4. A holder and protector as in claim 1, a retaining member comprising a bar extending across the outer side of the top wall adjacent the open end of said slot and secured to the top wall on one side of the slot, the end of said bar, located on the other side of said slot, being under-cut and spaced from the top wall and adapted to have a leader passed thereunder, between said last mentioned end portion of the bar and the top wall, for engagement with said slot.

5. A fish lure and leader holder and protector comprising a top wall, a bottom wall, side walls and one end wall, said side walls and end wall being inset relatively to the side edges and ends of the top wall and bottom wall, respectively, and combining with portions of the top and bottom walls to define a chamber open at the end thereof remote to said end wall, the top wall of said holder having a longitudinal slot extending from the open end of the holder to adjacent said end wall and communicating with the chamber, and a notch formed in said top wall and extending inwardly from the end thereof located adjacent the end wall.

PETER MARTINSON.

REFERENCES CITED

The following references are of record in the file of this patent:

UNITED STATES PATENTS

| Number | Name | Date |
|--------|------|------|
| 1,881,383 | Wylie | Oct. 4, 1932 |
| 1,926,836 | Corlett | Sept. 12, 1933 |
| 2,438,805 | Hoyle | Mar. 30, 1948 |